United States Patent
Lutz et al.

(10) Patent No.: US 10,435,600 B2
(45) Date of Patent: Oct. 8, 2019

(54) EPOXY RESIN COMPOSITIONS FOR PRE-GEL OVENS

(71) Applicant: Dow Global Technologies LLC, Midland, MI (US)

(72) Inventors: Andreas Lutz, Galgenen (CH); Jeannine Flueckiger, Freienbach (CH); Benjamin Alexander Haag, Horgen (CH); Regina Ditschuneit, Stuttgart (DE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/121,090

(22) PCT Filed: Mar. 19, 2015

(86) PCT No.: PCT/US2015/021498
§ 371 (c)(1),
(2) Date: Aug. 24, 2016

(87) PCT Pub. No.: WO2015/160468
PCT Pub. Date: Oct. 22, 2015

(65) Prior Publication Data
US 2017/0022402 A1    Jan. 26, 2017

Related U.S. Application Data

(60) Provisional application No. 61/979,042, filed on Apr. 14, 2014.

(51) Int. Cl.
| | |
|---|---|
| *C09J 163/00* | (2006.01) |
| *C09J 5/06* | (2006.01) |
| *C09J 9/00* | (2006.01) |
| *C09J 11/08* | (2006.01) |
| *B05D 3/02* | (2006.01) |

(52) U.S. Cl.
CPC .......... *C09J 163/00* (2013.01); *B05D 3/0272* (2013.01); *C09J 5/06* (2013.01); *C09J 9/00* (2013.01); *C09J 11/08* (2013.01); *C09J 2459/00* (2013.01); *C09J 2463/00* (2013.01); *C09J 2467/00* (2013.01)

(58) Field of Classification Search
None
See application file for complete search history.

(56) References Cited

U.S. PATENT DOCUMENTS

| | | | |
|---|---|---|---|
| 4,332,713 A * | 6/1982 | Lehmann | C09J 163/00 |
| | | | 156/328 |
| 5,728,257 A | 3/1998 | Lee | |
| 7,615,595 B2 | 11/2009 | Lutz et al. | |
| 8,404,787 B2 | 3/2013 | Lutz et al. | |
| 9,000,120 B2 | 4/2015 | Ming et al. | |
| 9,034,135 B2 | 5/2015 | Schulenburg et al. | |
| 2008/0045670 A1* | 2/2008 | Lutz | C09J 163/00 |
| | | | 525/404 |
| 2008/0149257 A1* | 6/2008 | Tribelhorn | C08G 18/12 |
| | | | 156/108 |
| 2008/0319105 A1* | 12/2008 | Lutz | C08G 18/12 |
| | | | 523/201 |
| 2010/0310878 A1 | 12/2010 | Hofstetter et al. | |
| 2011/0062027 A1* | 3/2011 | Brouwer | C23C 22/78 |
| | | | 205/50 |
| 2014/0124713 A1* | 5/2014 | Majumdar | H01B 1/22 |
| | | | 252/513 |
| 2015/0210052 A1* | 7/2015 | Wulff | B29C 65/4835 |
| | | | 156/273.5 |
| 2016/0032158 A1* | 2/2016 | Tang | C09J 109/00 |
| | | | 156/329 |

FOREIGN PATENT DOCUMENTS

| | | | | |
|---|---|---|---|---|
| WO | WO 2012158336 A1 * | 11/2012 | ......... | C08G 59/4021 |
| WO | 2013141955 A2 | 9/2013 | | |
| WO | 2013151835 A1 | 10/2013 | | |

OTHER PUBLICATIONS

Evonik, "DYNACOLL® 7330", Evonik, (Sep. 27, 2006).*

* cited by examiner

*Primary Examiner* — Kelly M Gambetta
(74) *Attorney, Agent, or Firm* — M. Robert Christy

(57) ABSTRACT

An epoxy adhesive composition is provided that has superior wash-off resistance after pre-gelling, and may be used, for example, in manufacturing processes, for example, in the automobile industry. The composition also provides unique viscosity profile after pre-gelling to significantly reduce failure mode in subsequent processing steps. In preferred embodiments the adhesive composition comprises an epoxy type resin and a gelling agent selected from polyesterdiols and polyvinyl butyrals.

2 Claims, No Drawings

EPOXY RESIN COMPOSITIONS FOR PRE-GEL OVENS

FIELD OF THE INVENTION

The present invention relates to epoxy adhesive systems, including, e.g., epoxy adhesives that have good wash-off resistance, and is suitable for pre-gelling process in pre-gel ovens.

INTRODUCTION

Some manufacturers, e.g., automobile manufacturers, use pre-gel ovens to pre-gel epoxy adhesive applications of partially assembled products, e.g., auto body parts, prior to the partially assembled parts passing through subsequent processing, such as washing, phosphate and e-coat baths. Such pre-gel ovens typically run at temperatures of about 110° C. to 120° C. Partially assembled parts, e.g., car bodies, typically pass through the pre-gel oven in about 5 to 20 minutes. In this time and at this temperature the adhesive must be pre-gelled or pre-cured to such an extent, that the viscosity and viscous yield stress will have increased to a level that prevents the adhesive from becoming washed-out in the subsequent processing, e.g, the subsequent baths. Such subsequent processing generally occurs at elevated temperatures, e.g., temperatures between 40° C. to 60° C. It is, therefore, desired that a pre-gelled epoxy adhesive be sufficiently set that it does not wash off at these temperatures under typical processing conditions. On the other hand, however, it has been noticed that when the viscosity of the adhesives has increased to a certain level, defects in the finally cured parts occur, especially in the joints, which are visible as voids or as a meander type of failure mode. WO2013141955A2 provides an adhesive composition with similar components. However, the viscosity of the pre-gelled adhesive is too high hence causing joint failure in subsequent processing steps.

Therefore, it is desired to have an adhesive composition that can increase the viscosity during pre-gelling process to achieve the purpose of wash-off resistance while not high enough to cause defect issues in subsequent processing steps.

SUMMARY OF THE INVENTION

It has been surprisingly found that, when carefully monitoring the pre-gel viscosity profile, the adhesive composition of the present invention provides the pre-gelled adhesive (after the pre-gel oven processing step) with a viscosity level at temperatures at and below 60° C. high enough to prevent the wash-off in the baths (degreasing, phosphate and e-coat baths) in post pre-gelling process while still low enough at temperatures at and above 80° C. to avoid various failure modes in the joints of the car body of the cured adhesive.

In one embodiment, the pre-gelled adhesive composition exhibits a viscosity below 500 Pas at 80° C., preferably below 400 Pas. At 100° C., the pre-gelled adhesive exhibits a viscosity below 400, preferably below 300 Pas.

In another embodiment, the storage modulus (G') of the pre-gelled adhesive composition at 80° C. exhibits a value below 3000 and preferably below 2000 Pa. At 100° C., G' is maintained below 2000 Pa.

In some other preferred embodiment, the viscosity and G's values of the pre-gelled adhesive composition are lower than those of the adhesive composition before the pre-gelling process.

DETAILED DESCRIPTION OF THE INVENTION

We have found that use of certain gelling agents in the adhesive composition can achieve the purposes as discussed above. Specifically, the present invention provides an adhesive composition that contains one or more gelling agents, liquid or solid epoxy resins, a toughening agent, a hardener, curing accelerator and fillers. Optionally, the present adhesive composition may further contain rubber-like substances to help with co-toughening, impact resistance at low temperatures and the balance of Tg of the cured adhesive composition.

1. The Gelling Agent

Preferred gelling agent should comprise functional groups that are capable of reacting with an epoxy resin. These include thermoplastic compounds such as polyesterdiols, polyamides, or polyvinyl butyral. In the present invention, polyesterdiols are the most preferred gelling agent.

Examples of suitable gelling agents include polyesterdiols, e.g., Dynacoll® 7330 available from Evonik. Castor oil wax with polyamides may also be used, and is commercially available from Rockwood under the trade name Rheotix, e.g., Rheotix 240. Other suitable gelling agents include Luvotix grades (like Luvotix HP) supplied from Lehmann, and Voss which is a polyamide without the wax or Disparlon grades supplied from Kusumoto Chemicals Ltd. Suitable polyvinyl butyrals include Mowital B 60H and Mowital B 60HH from Kuraray. These gelling agents may be used alone or in combination with each other in the adhesive composition.

As the gelling agent is a polymer, it will generally have a high molecular weight. The preferred molecular weight of the gelling agent used in the present invention will generally be at least 1,000 g/mol, 2,000 g/mol or 3,000 g/mol. The gelling agent will generally and preferably have a molecular weight less than 5,000 g/mol or 4,000 g/mol. Some gelling agents may be outside of this preferred range but also workable in the present invention.

Any amount of gelling agent may be used to obtain the desired properties, and the person of ordinary skill in the art will be able to determine a suitable amount for any particular application. Gelling agent will generally comprise at least 1 wt %, 2 wt % or 3 wt % of the epoxy adhesive composition. Gelling agent will generally comprise less than or equal to 10 wt %, 6 wt % or 5 wt % of the epoxy adhesive composition.

In preferred embodiments when polyesterdiols are used as the gelling agent, the adhesive composition will comprise less than 7 wt %, more preferably less than 5 wt %, and most preferably less than 4 wt % of the gelling agent.

In preferred embodiments when polyvinyl butyrals are used as the gelling agent, the adhesive composition will comprise less than 5 wt %, more preferably less than 4 wt %, and most preferably less than 3 wt % of the gelling agent.

In preferred embodiments when polyamides are used as the gelling agent, the adhesive composition will comprise less than 1.5 wt %, more preferably less than 1 wt %, and most preferably less than 0.5 wt % of the gelling agent.

2. Epoxy Resins

Epoxy resins useful in this invention include a wide variety of curable epoxy compounds and combinations thereof. Useful epoxy resins include liquids, solids, and mixtures thereof. Typically, the epoxy compounds are epoxy resins which are also referred to as polyepoxides. Polyepoxides useful herein can be monomeric (e.g., the diglycidyl ether of bisphenol A, diglycidyl ether of bisphenol F, diglycidyl ether of tetrabromobisphenol A, novolac-based epoxy resins, and tris-epoxy resins), higher molecular weight resins (e.g., the diglycidyl ether of bisphenol A advanced with bisphenol A) or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule. Solid epoxy resins that may be used in the present invention preferably can comprise or preferably be based upon mainly bisphenol A. However, the amount of bisphenol A used should be kept below 0.5 wt % of the adhesive composition in order to achieve the viscosity profile of the present invention. Some preferred epoxy resins include, for example, D.E.R.™ 330, D.E.R. 331, and D.E.R. 671, all commercially available from The Dow Chemical Company.

One preferable epoxy resin has general formula:

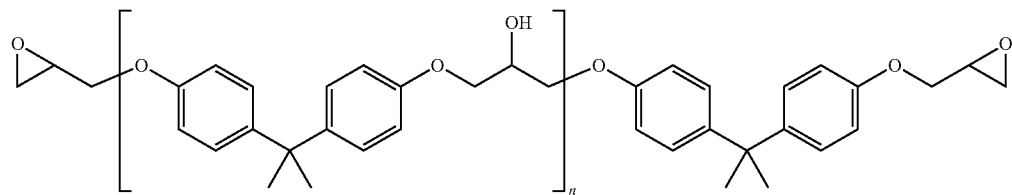

where n is generally in the range of 0 to about 25. Basic liquid resins, e.g. D.E.R. 331, have epoxy equivalent weights in the range of about 180 to 195 g/mol.

Combinations of epoxy resins may be used to adjust properties of the epoxy adhesive. In compositions and methods of the present invention, the epoxy adhesive may comprise any amount of epoxy resin. Preferably, the liquid and/or solid epoxy resin comprises more than or about 30 wt %, more preferably more than or about 35 wt % or 40 wt %, of the epoxy adhesive. Preferably, the liquid and/or solid epoxy resin comprises less than or about 65 wt %, more preferably less than or about 55 wt % or 45 wt %, of the epoxy adhesive. In one preferred embodiment, the composition of the present invention contains 40 to 60 wt % of a liquid epoxy resin and 2 to 6 wt % of a solid epoxy resin.

3. Toughener

A toughener is used in the compositions and methods of the present invention. Any toughener may be used, including, e.g., capped polyurethanes (equivalent to blocked PU) and rubber epoxy resins, as well as combinations thereof. Some preferred tougheners include those described in U.S. Pat. Nos. 8,424,787, 8,062,468, 5,278,257, EP2084200, EP 0308664, or US 2006/0276601 A1. When used, tougheners, e.g., capped-PU tougheners, may be present in amounts more than or about 5 wt %, preferably more than or about 10 wt % of the epoxy adhesive, and more preferably more than 20 wt %. When used, tougheners may be present in amounts less than or about 20 wt %, more preferably less than or about 18 wt % of the adhesive composition.

4. Hardeners

The adhesive compositions of the present invention preferable contain a hardener. Some preferred hardeners include dicyandiamide, imidazoles, amines, amides, polyhydric phenols, and polyanhydrides. Dicyandiamide (also known as DICY, dicyanodiamide, and 1- or 2-cyanoguanidine) is preferred and is commercially available as Amicure CG1200 from Air Products. The amount of hardener used is preferably between 1 to 8 wt % and more preferably between 2 to 6 wt %, based on the weight of the adhesive composition.

5. Curing Agent and Accelerator

Any curing agent appropriate for a one-component (1K) or two-component (2K) epoxy adhesive may be used. As is known in the art, a 1K epoxy adhesive contains all of the ingredients for the adhesive in a single composition, and does not cure until exposed to the appropriate conditions (e.g., heat or radiation), which activates the latent hardener. In a 2K epoxy adhesive, curing can take place at ambient conditions, such that the adhesive comprises at least two different compositions, which are kept separate until use.

The curing agent, preferably for a 1K adhesive composition, preferably comprises a latent curing agent. Any latent curing agent that does not cause hardening under ambient conditions ("ambient conditions" meaning, e.g., typical room temperature and normal lighting conditions) may be used. A latent curing agent that causes the epoxy adhesive to be curable by application of heat is preferred.

Any amount of curing agent may be used as appropriate for any particular composition according to the present invention, and may be determined by one of ordinary skill in the art. The amount of curing agent is preferably more than or equal to 0.1 wt %, more preferably more than or equal to 1.5 wt %, more preferably more than or equal to 3 wt % of the epoxy adhesive. The amount of curing agent is preferably less than or equal to 5 wt %, more preferably less than or equal to 4 wt % of the epoxy adhesive.

Use of a curing accelerator is optional, but preferred. When a latent curing agent is used, the curing accelerator is preferably present in sufficient amount to catalyze the curing reaction when exposed to conditions, e.g., temperatures, at which the latent curing agent catalyzes the curing process. When used, any suitable curing accelerator may be used, and may be selected by one having ordinary skill in the art. Some preferred curing accelerators include ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl) phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in U.S. Pat. No. 4,713,432 and EP 0 197 892). The curing accelerator may, for example, comprise a composition obtained from a combination of a high-boiling nitrogen base, and a phenolic polymer which is an addition polymer of a phenol bearing an unsaturated substituent. Particularly preferred curing accelerators include blocked tert-amines using polymeric phenols like PVP or Novolak. Another particularly preferred curing accelerator comprises 2,4,6-tris(dimethylaminomethyl)phenol integrated into a poly(p-vinyl)phenol matrix. Accelerators like those disclosed in WO 2012006001 are also suitable.

Preferably, the curing accelerator is present in the adhesive composition in the amount of, or greater than, 0 wt %, 0.1 wt %, or 0.3 wt %. Preferably, the curing accelerator is present in an amount of, or less than, 3 wt %, 1.5 wt % or 1 wt %.

6. Rubber Components and Other Fillers

Rubber components, including liquid rubber or core-shell rubber may be optionally used in the present invention. Some preferred liquid rubber and core-shell rubber compositions are disclosed in U.S. Pat. Nos. 7,642,316 and 7,625,977.

A rubber-modified epoxy resin is an epoxy-terminated adduct of an epoxy resin and at least one liquid rubber that has epoxide-reactive groups, such as amino or preferably carboxyl groups. The rubber in this case is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized unsaturated nitrile monomer.

The rubber preferably contains (prior to reaction with the epoxy resin to form the adduct) from about 1.5, more preferably from about 1.8, to about 2.5, more preferably to about 2.2, epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubber starting materials are commercially available from Noveon under the trade names Hycar® 2000X162 carboxyl-terminated butadiene homopolymer and Hycar® 1300X31 Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the trade name Hycar® 1300X21.

Some preferred rubber modified epoxy resins are sold under the trade name Struktol®, e.g., Struktol® 3604. When used, rubber modified epoxy resins may be present in amounts more than or about 5 wt %, more preferably more than or about 8 wt %, more preferably more than or about 10 wt % of the epoxy adhesive. When used, rubber modified epoxy resins may be present in amounts less than or about 25 wt %, more preferably less than or about 20 wt % of the epoxy adhesive.

The rubber is formed into an epoxy-terminated adduct by reaction with an excess of an epoxy resin. Enough of the epoxy resin is provided to react with all of the epoxide-reactive groups on the rubber and to provide free epoxide groups on the resulting adduct, without significantly advancing the adduct to form high molecular weight species. A ratio of at least two equivalents of epoxy resin per equivalent of epoxy-reactive groups on the rubber is preferred. More preferably, enough of the epoxy resin compound is used that the resulting product is a mixture of the adduct and some free epoxy resin compound. Typically, the rubber and an excess of the epoxy resin are mixed together with a polymerization catalyst and heated to a temperature of about 100 to about 250° C. in order to form the adduct. Useful catalysts for conducting the reaction between the rubber and the epoxy resin include those described below. Preferred catalysts for forming the rubber-modified epoxy resin include phenyl dimethyl urea and triphenyl phosphine.

A wide variety of epoxy resins can be used to make the rubber-modified epoxy resin, including any of those described before. Preferred epoxy resins are liquid or solid glycidyl ethers of a bisphenol such as bisphenol A or bisphenol F. Halogenated, particularly brominated, resins can be used to impart flame retardant properties if desired. Liquid epoxy resins (such as DER 330 and DER 331 resins, which are diglycidyl ethers of bisphenol A available from The Dow Chemical Company) are especially preferred for ease of handling.

When a rubber-modified epoxy resin is present, as just described, the rubber-modified epoxy resin will serve as all or part of each of components (A) (the epoxy resin) and (B) (the toughening rubber) of the structural adhesive of the invention. Thus, if a rubber-modified epoxy resin is present, it is not necessary for the structural adhesive to include any additional toughening rubber or any additional epoxy resin. However, one or more such additional epoxy resins may also be present, and one or more additional toughening rubbers, notably a core-shell rubber as described below, may also be present together with a rubber-modified epoxy resin.

The core-shell rubber component may be a particulate material having a rubbery core. Any core-shell rubber material may be used in the present invention.

The rubbery core preferably has a Tg of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized mono-unsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl.

The shell polymer, which is optionally chemically grafted or crosslinked to the rubber core, is preferably polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups are suitable. These can be provided by monomers such as glycidyl methacrylate.

A particularly preferred type of core-shell rubber is of the type described in U.S. 2007/0027233 (EP 1 632 533 A1). Core-shell rubber particles as described in the document include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Preferred core-shell rubbers (CSRs) include those sold by Kaneka Corporation under the designation Kaneka Kane Ace, including the Kaneka Kane Ace 15 and 120 series of products, including Kaneka Kane Ace MX 153, Kaneka Kane Ace MX 156 and Kaneka Kane Ace MX 120 core-shell rubber dispersions, and mixtures thereof. The products contain the core-shell rubber particles pre-dispersed in an epoxy resin, at concentrations of approximately 33% or 25%.

Any amount of core-shell rubber may be used. When present, the epoxy adhesive of the invention preferably has a total core-shell rubber content of at least 1 wt %, more preferably at least 3 wt %, more preferably at least 5 wt %, more preferably at least 8 wt %. The epoxy adhesive of the invention preferably has a total core-shell rubber content up to 15 wt %, more preferably up to 12 wt %. A preferred amount includes 10 wt %. When the CSR is provided, e.g., as a dispersion, the total CSR content is calculated for purposes of this invention based on the weight of the CSR in the composition.

Other flexibilizers, such as polyamine-epoxy adducts may also be used as a rubber component. Some suitable polyamine-epoxy adducts are disclosed in U.S. Pat. Nos. 5,567,748 and 4,507,412.

Fillers may also be optionally used in the present invention. When used, fillers may be present in any useful amount, and can be determined by those of ordinary skill in the art using this document as guidance. Typically, fillers may be present in amounts more than or about 3 wt %, more preferably more than or about 5 wt % of the epoxy adhesive. Fillers may be present in amounts less than or about 20 wt %, more preferably less than or about 15 wt % of the epoxy adhesive.

Optional fillers include mineral fillers, such as calcium carbonate, calcium oxide, and talc. Calcium carbonate (e.g., sold under trade name Omya®), which can be used to reduce shrinkage and increase corrosion resistance. Calcium oxide (e.g., sold under the trade name Chaux Vive) is a humidity scavenger that may help to preserve a partially-cured epoxy adhesive prior to final curing. Talc is available, e.g., under the trade name Mistrofil®, and aluminum magnesium silicate (wollastonite) is available, e.g., under the trade name Nyad® 200.

Thixotropic agents and other viscosity regulators may also be optionally used. One such preferred example includes fumed silica (e.g., sold under the trade name Aerosil®). A preferred thixotropic agent that also improves wash-off resistance is a mixture of polyester and liquid epoxy resin (LER), such as Dynacol (25% polyester 7330 and 75% LER 330).

When used, fumed silica may be present in amounts more than or about 2 wt %, preferably more than or about 6 wt % of the epoxy adhesive. Fumed silica may be present in amounts less than or about 15 wt %, more preferably less than or about 12 wt % of the epoxy adhesive.

At least one adhesion promoter may also be optionally used. Preferred adhesion promotes include epoxy silanes, e.g., sold under the trade name Silquest™ A-187.

At least one surfactant or wetting agent may be optionally used. A preferred wetting agent is a non-ionic fluorinated polymer. Such agents are also preferably capable of absorbing residual oils (e.g., manufacturing and processing oils) on metal surfaces, thereby facilitating adhesion to metal surfaces.

EXAMPLES

Some embodiments of the invention will now be described in detail in the following Examples, wherein all parts and percentages are by weight unless otherwise specified.

1. Inventive and Comparative Samples

Raw materials used in preparing samples of the present application and their sources are summarized in Table 1.

TABLE 1

|  | Supplier | Content or Prepared from |
|---|---|---|
| DER 330 | Dow Chemical | Liquid epoxy resin |
| DER 671 | Dow Chemical | Solid epoxy resin |
| Toughener A |  | U.S. Pat. No. 8,404,787 B2: example 2 |
| Toughener B |  | U.S. Pat. No. 5,278,257: example 13 |
| Struktol 3604 | Schill & Seilacher | X8 CTBN-LER (liquid epoxy resin like D.E.R. 330) adduct: 60:40 |
| Struktol 3614 | Schill & Seilacher | X13 CTBN-LER adduct: 60:40 |
| Amicure CG 1200 | Air Products | dicyandiamide |
| Curing Agent |  | US 2013/0090431 A1: example 5 |
| Omya BSH | Omya | calciumcarbonate |
| Chaux vive | Lhoist | calciumoxide |
| Talk 1N | IMCD Deutschland |  |
| Mowital | Kuraray | polyvinylbutyral |
| Nyad 200 | NYCO Minerals | Wollastonite |
| Dynacoll 7330 | Evonik | Polyester-diol |
| Rheotix 240 | Rockwood Clay Additives GmbH | Polyamide in castor oil |
| Luvotix HT or HP | Lehmann & Voss | polyamide |

Some Inventive Samples (IS 1-4) and Comparative Samples (CS 1-4) were prepared as shown in Table 2.

TABLE 2

| Inventive and Comparative Samples components in wt. % | | | | | | | | |
|---|---|---|---|---|---|---|---|---|
| | IS-1 | IS-2 | IS-3 | IS-4 | CS-1 | CS-2 | CS-3 | CS-4 |
| Raw materials | | | | | | | | |
| Gelling compound % | 4 | | 0.5/4 | 1/4 | 1.5 | 2 | 3 | 2.75 |
| DER 330 | 23.79 | 51.33 | 23.33 | 23.33 | 41.89 | 41.39 | 40.53 | 41.23 |
| DER 671 | 4 | | 4 | 4 | 4 | 4 | 4 | 4 |
| Toughener A | 9 | | 7.5 | 7.5 | 7.5 | 7.5 | 9 | 9 |
| Toughener B | 7.5 | 17.19 | 9 | 9 | 9 | 9 | 7.5 | 7.5 |
| Struktol 3604 | 6.5 | 5.73 | 6.5 | 6.5 | 6.5 | 6.5 | 6.5 | 6.5 |
| Struktol 3614 | 6.5 | 5.73 | 6.5 | 6.5 | 6.5 | 6.5 | 6.5 | 6.5 |
| Amicure CG 1200 | 4.4 | 5.1 | 4.35 | 4.35 | 4.61 | 4.61 | 4.47 | 4.72 |
| Curing Agent | 0.7 | 0.75 | 0.7 | 0.7 | 0.7 | 0.7 | 0.7 | 0.7 |
| Mineral fillers* | 13.9 | 7.18 | 13.9 | 13.9 | 13.9 | 13.9 | 13.9 | 13.9 |
| Fumed silica mix | 3.9 | 4.5 | 3.9 | 3.9 | 3.9 | 3.9 | 3.9 | 3.2 |
| Gelling compounds | | | | | | | | |
| Mowital | | 2.49 | | | | | | |
| Dynacoll 7330-DER 330 blend 20:80 wt. | 19.81 | | 19.82 | 19.32 | | | | |
| Rheotix | | | 0.5 | 1 | 1.5 | 2 | | 2.75 |
| Luvotix HT | | | | | | | 3 | |
| Total: | 100 | 100 | 100 | 100 | 100 | 100 | 100 | 100 |

*A combination of calciumoxide, calciumcarbonate and wollastonite

Inventive Samples comprise gelling compounds or combinations of different gelling compounds which offer good gelling properties up to temperatures of 60° C. (increase of viscosity and storage modulus in a temperature range 23 to 60° C.), but which show little increase or even a decrease of the viscosity and the storage modulus at higher temperatures such as 80 or 100° C. This behavior is surprising and prevents the adhesive joint from failing in the gelling oven. The gelling compound which is used in Inventive Sample 2 offered the smallest gelling effect and a viscosity and storage modulus decrease already happens at temperatures higher than 50° C.

Inventive Sample 1 uses a crystalline polyesterdiol as the gelling compound which offers medium gelling.

Inventive Sample 2 uses polyvinylbutyral as the gelling compound, which offers weak gelling.

Inventive Sample 3 uses a combination of a polyesterdiol and a polyamide (in castor oil) as gelling compounds. According to WO 2009/095484, polyamides are preferably used for gellable adhesive performance because of their excellent gelling.

Inventive Sample 4 is similar to Inventive Sample 3, but uses a slightly higher amount of the polyamide.

Comparative Samples 1 to 4 comprise a gelling compound (polyamide or polyamide in castor oil) which gels the adhesive composition very effectively. All viscosity or storage modulus data show a significant increase over the entire temperature range.

Comparative Sample 1 uses a polyamide in castor oil as only gelling compound at a higher level than in Inventive Sample 3.

Comparative Samples 2 and 4 use same gelling compound as Inventive Sample 4 but in higher amounts.

Comparative Sample 3 uses a high amount of a polyamide.

2. Testing Methods

Rheologies: Rotatory viscosity/yield stress: Bohlin CS-50 Rheometer, C/P 20, up/down 0.1-20s/l; evaluation according to Casson model. Oscillation viscosity/Temperature curve: Anton Paar MCR 302 Rheometer, PP25, 10 to 200° C. (5°/min), d=1 mm, Amplitude gamma 0.005%, frequency 1 Hz Mechanical testing used steel: HC220B-ZE-B ex Thyssen Krupp steel. Lap shear strength uses DIN EN 1465: 10×25 mm bonded area, 0.2 mm adhesive layer thickness. Impact peel strength uses ISO 11343: 20×30 mm bonded area, 0.2 mm adhesive layer thickness Rheology and Mechanical Testing Units:

$\eta^*$ complex viscosity as a result of oscillation rheology testing

G' storage modulus as a result of oscillation rheology testing

3. Test Results

Table 3 summarizes the test results for viscosity and for mechanical testing. Casson viscosity data are presented as a reference value only. Complex viscosity $\eta^*$ is presented to show the differences in viscosity before and after gelling at different test temperatures. Viscosities of the gelled composition at temperatures at 60° C. and below are relevant to determine the wash-off resistance. Viscosities of the gelled composition at temperatures at 80° C. and above are relevant to determine the performance of the adhesive composition in the joint while passing the pre-gel oven.

TABLE 3

Viscosity and mechanical performance of the Samples

|  | IS-1 | IS-2 | IS-3 | IS-4 | CS-1 | CS-2 | CS-3 | CS-4 |
|---|---|---|---|---|---|---|---|---|
| Initial |  |  |  |  |  |  |  |  |
| Viscosity, Casson, 45° C. [Pas] | 71 | 37 | 50 | 53 | 36 | 32 | 35 | 26 |
| Yield stress, Casson, 45° C. [Pa] | 166 | 125 | 155 | 163 | 130 | 90 | 186 | 125 |
| $\eta^*$ at 23° C. [Pas] | 5750 | 2500 | 6010 | 7530 | 4100 | 4660 | 8620 | 4460 |
| $\eta^*$ at 30° C. [Pas] | 3760 | 1660 | 3950 | 4310 | 2520 | 3040 | 5840 | 2720 |
| $\eta^*$ at 50° C. [Pas] | 1660 | 872 | 1580 | 1490 | 993 | 1250 | 2940 | 884 |
| $\eta^*$ at 60° C. [Pas] | 1220 | 752 | 1160 | 856 | 581 | 754 | 1880 | 577 |
| $\eta^*$ 80° C. [Pas] | 249 | 620 | 191 | 185 | 321 | 342 | 392 | 331 |
| $\eta^*$ 100° C. [Pas] | 263 | 532 | 183 | 173 | 285 | 302 | 341 | 318 |
| After pre-gelling |  |  |  |  |  |  |  |  |
| $\eta^*$ at 23° C. [Pas] | 36500 | 4300 | 24200 | 30900 | 5070 | 16800 | 23800 | 28200 |
| Delta $\eta^*$gelled-$\eta^*$initial | 30750 | 1800 | 18190 | 23370 | 970 | 12140 | 15180 | 23740 |
| $\eta^*$ at 30° C. [Pas] | 21400 | 2410 | 17300 | 20800 | 2960 | 10400 | 17100 | 16100 |
| Delta $\eta^*$gelled-$\eta^*$initial | 17640 | 750 | 13350 | 16490 | 440 | 7360 | 11260 | 13380 |
| $\eta^*$ at 50° C. [Pas] | 7360 | 774 | 8540 | 9810 | 1020 | 3640 | 8920 | 5810 |
| Delta $\eta^*$gelled-$\eta^*$initial | 5700 | −98 | 6960 | 8320 | 27 | 2390 | 5980 | 4926 |
| $\eta^*$ at 60° C. [Pas] | 3290 | 527 | 4880 | 5190 | 695 | 2310 | 5570 | 3730 |
| Delta $\eta^*$gelled-$\eta^*$initial | 2070 | −225 | 3720 | 4334 | 114 | 1556 | 3690 | 3153 |
| $\eta^*$ 80° C. [Pas] | 161 | 331 | 162 | 197 | 515 | 619 | 1490 | 958 |
| Delta $\eta^*$gelled-$\eta^*$initial | −88 | −289 | −29 | 12 | 194 | 277 | 1098 | 627 |
| $\eta^*$ 100° C. [Pas] | 150 | 258 | 141 | 180 | 483 | 425 | 1170 | 697 |
| Delta $\eta^*$gelled-$\eta^*$initial | −113 | −274 | −42 | 7 | 198 | 123 | 829 | 379 |
| Mechanical properties |  |  |  |  |  |  |  |  |
| Impact peel strength at RT [N/mm] | 31 | 44 | 37 | 34 | 36 | 35 | 36 | 37 |
| Impact peel strength [J] | 10 | 16 | 14 | 13 | 14 | 13 | 14 | 12 |
| Lap shear strength [MPa] | 23.6 | 26.9 | 25 | 25 | 26 | 26 | 25 | 24.1 |

As shown in Table 3, the viscosities after gelling of all Inventive and Comparative Samples, with the exception of Inventive Sample 2 at temperatures of 60° C. and below, increase significantly. Inventive Sample 2 contains a weak gelling compound and the viscosity increase is observed at temperatures below 50° C. All samples, except for Inventive Sample 2, as a result of the experienced viscosity increase, provide good wash-off performance in the body shop baths.

The viscosities after gelling at temperatures of 80° C. and above for the Inventive Samples are at a relatively low value compared to those of the Comparative Samples. Most of the Inventive Samples surprisingly exhibit a lower viscosity value after gelling than before. This unexpected result provided excellent joint performance of these Inventive Sample compositions when passing through the pre-gel oven.

The viscosities after gelling at temperatures of 80° C. and above for the Comparative Samples are at a relatively high value and the viscosity difference of gelled to non gelled is in each case significantly positive.

Table 4 summarizes the test results for the storage modulus G'. G' is presented to show the differences in viscosity before and after gelling at different test temperatures. Storage moduli of the gelled compositions at temperatures at 60° C. and below are relevant to determine the wash-off resistance. G' of the gelled formulations at temperatures at 80° C. and above are relevant to determine the performance of the adhesive compositions in the joint while passing through the pre-gel oven.

The conclusions are almost identical to the conclusions made based on the viscosity data in Table 3.

TABLE 4

Storage modulus G' performance of the inventive over the referenced formulation

|  | IS-1 | IS-2 | IS-3 | IS-4 | CS-1 | CS-2 | CS-3 | CS-4 |
|---|---|---|---|---|---|---|---|---|
| Initial |  |  |  |  |  |  |  |  |
| G' at 23° C. [Pa] | 25300 | 10700 | 25900 | 27900 | 15500 | 18500 | 39000 | 17000 |
| G' at 30° C. [Pa] | 18100 | 7970 | 18600 | 17300 | 11100 | 13600 | 28900 | 11400 |
| G' at 50° C. [Pa] | 9250 | 5040 | 8610 | 7490 | 5350 | 6730 | 16600 | 4410 |
| G' at 60° C. [Pa] | 7070 | 4480 | 6710 | 4420 | 3320 | 4140 | 10900 | 3150 |
| G' at 80° C. [Pa] | 1470 | 3750 | 1100 | 1020 | 1920 | 2030 | 2310 | 1950 |
| G' at 100° C. [Pa] | 1610 | 3260 | 1110 | 1030 | 1740 | 1030 | 2080 | 1940 |

TABLE 4-continued

Storage modulus G' performance of the inventive over the referenced formulation

|  | IS-1 | IS-2 | IS-3 | IS-4 | CS-1 | CS-2 | CS-3 | CS-4 |
|---|---|---|---|---|---|---|---|---|
| After pre-gelling |  |  |  |  |  |  |  |  |
| G' at 23° C. [Pa] | 160000 | 14200 | 119000 | 152000 | 17600 | 71800 | 116000 | 126000 |
| Delta G'gelled-G'initial | 134700 | 3500 | 93100 | 124100 | 2100 | 53300 | 77000 | 109000 |
| G' at 30° C. [Pa] | 99900 | 9070 | 91100 | 105000 | 11300 | 46800 | 92600 | 73100 |
| Delta G'gelled-G'initial | 81800 | 1100 | 72500 | 87700 | 200 | 33200 | 63700 | 61700 |
| G' at 50° C. [Pa] | 41100 | 3600 | 49700 | 56200 | 5060 | 18800 | 51500 | 31000 |
| Delta G'gelled-G'initial | 31850 | −1440 | 41090 | 48710 | −290 | 12070 | 34900 | 26590 |
| G' at 60° C. [Pa] | 18800 | 2680 | 29000 | 30400 | 3730 | 12700 | 32000 | 20800 |
| Delta G'gelled-G'initial | 11730 | −1800 | 22290 | 25980 | 410 | 8560 | 21100 | 17650 |
| G' at 80° C. [Pa] | 676 | 1860 | 863 | 1020 | 3040 | 3470 | 8840 | 5560 |
| Delta G'gelled-G'initial | −794 | −1890 | −237 | 0 | 1120 | 1440 | 6530 | 3610 |
| G' at 100° C. [Pa] | 831 | 1520 | 822 | 1050 | 2940 | 2450 | 7090 | 4140 |
| Delta G'gelled-G'initial | −779 | −1740 | −288 | 20 | 1200 | 1420 | 5010 | 2200 |

The adhesive compositions were applied at critical car parts such as side frame or hood and then vehicle bodies were run through the body shop, involving pre-gel oven and e-coat oven. The vehicle bodies were then disassembled and the failure mode was visually inspected.

All Inventive Samples showed a clear superior results compared to the Comparative Samples which all showed significant failures in the joints. The joint performance of the Inventive Samples matches surprisingly well with the viscosity data in Table 3 at test temperatures of 80 and 100° C. The performance for the Inventive Samples where the gelled to non gelled viscosity difference was negative performed slightly better.

Based on above data, it is concluded that all Inventive Samples showed a good joint performance after passing the body shop. All Inventive Samples showed a good gelling performance in the pre-gel oven, which offers good wash-off resistance. All Inventive Samples showed a significantly lower complex viscosity and storage modulus in the gelled stage at the relevant temperatures of 80° C. and above. Most of the Inventive Samples showed even a negative difference of the gelled to non gelled viscosity and the storage modulus at the relevant temperatures of 80° C. and above. All Comparative Samples showed a significantly higher complex viscosity and storage modulus in the gelled stage at the relevant temperatures of 80° C. and above. All Comparative Samples showed high positive difference of the gelled to non gelled viscosity and the storage modulus at the relevant temperatures of 80° C. and above.

The invention claimed is:

1. A process for forming an adhesive bond, comprising
a) applying an adhesive composition to a joint of an article; then
b) heating the article with the applied adhesive composition in a pre-gel oven at a temperature of 110 to 120° C. for a period of 5 to 20 minutes to pre-gel the adhesive composition, wherein at 60° C. the pre-gelled adhesive composition exhibits a Casson complex viscosity greater than the Casson complex viscosity of the adhesive composition at 60° C. prior to step b), and the pre-gelled adhesive exhibits a Casson complex viscosity below 300 Pas at 80° C.;
c) immersing the article with the pre-gelled adhesive composition in at least one of a degreasing, phosphate or e-coat bath at a temperature of 40 to 60° C.; and
d) then curing the adhesive composition by application of heat to form the adhesive bond at the joint of the article, wherein the adhesive composition consists of at least one epoxy resin, 4.35 to 6 weight-% of dicyandiamide, a curing accelerator, 3 to 6 weight-%, based on the weight of the adhesive composition, of a gelling agent selected from a polyester diol having a molecular weight of 1000 to 5000 g/mol or a mixture of a polyester diol having a molecular weight of 1000 to 5000 g/mol and a polyamide having a molecular weight of 1000 to 5000, and optionally one or more of a toughener, a filler, a thixotropic agent, an adhesion promoter, a surfactant, or a wetting agent.

2. The process of claim 1 wherein the gelling agent is a mixture of a polyester diol having a molecular weight of 1000 to 5000 g/mol and a polyamide having a molecular weight of 1000 to 5000.

* * * * *